Feb. 3, 1970

A. J. SABLE ET AL 3,493,301

DOCUMENT PROCESSING METHOD

Filed Jan. 26, 1966

A. J. SABLE ET AL 3,493,301

DOCUMENT PROCESSING METHOD

Filed Jan. 26, 1966

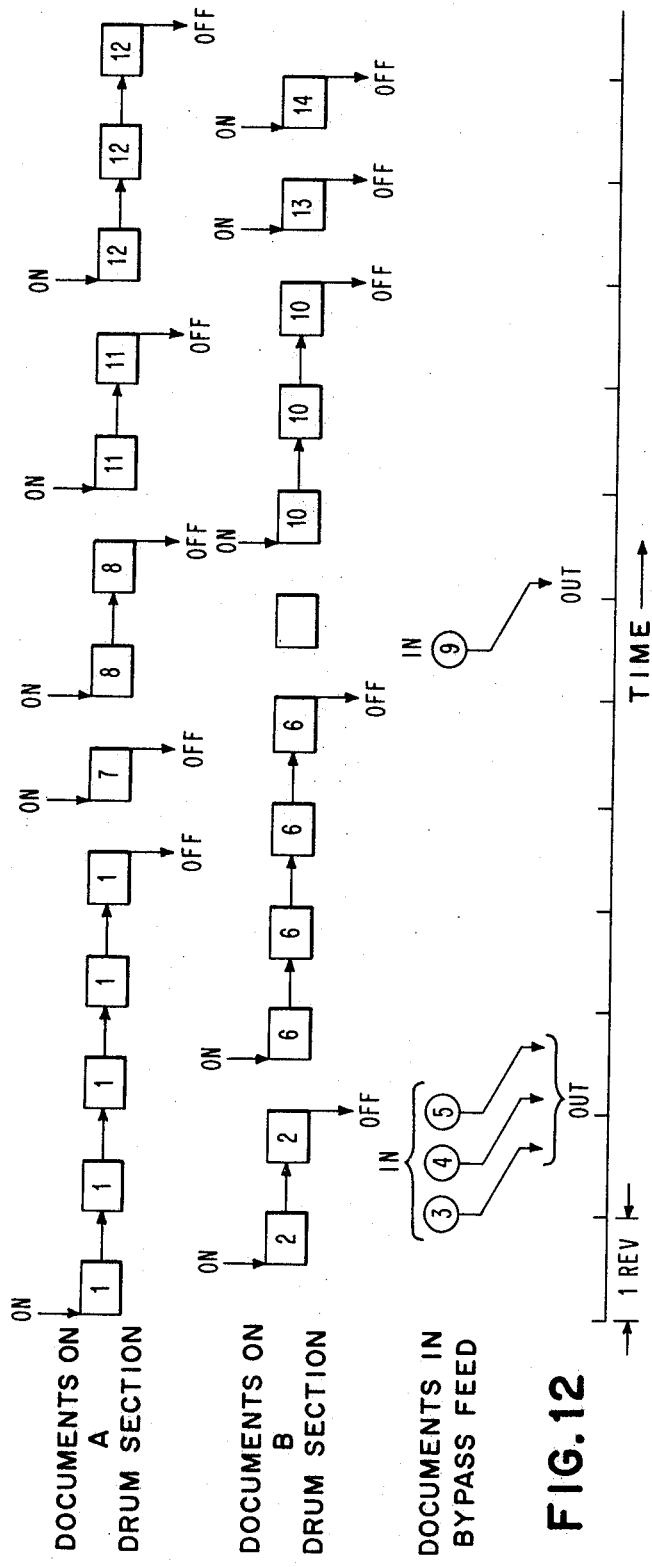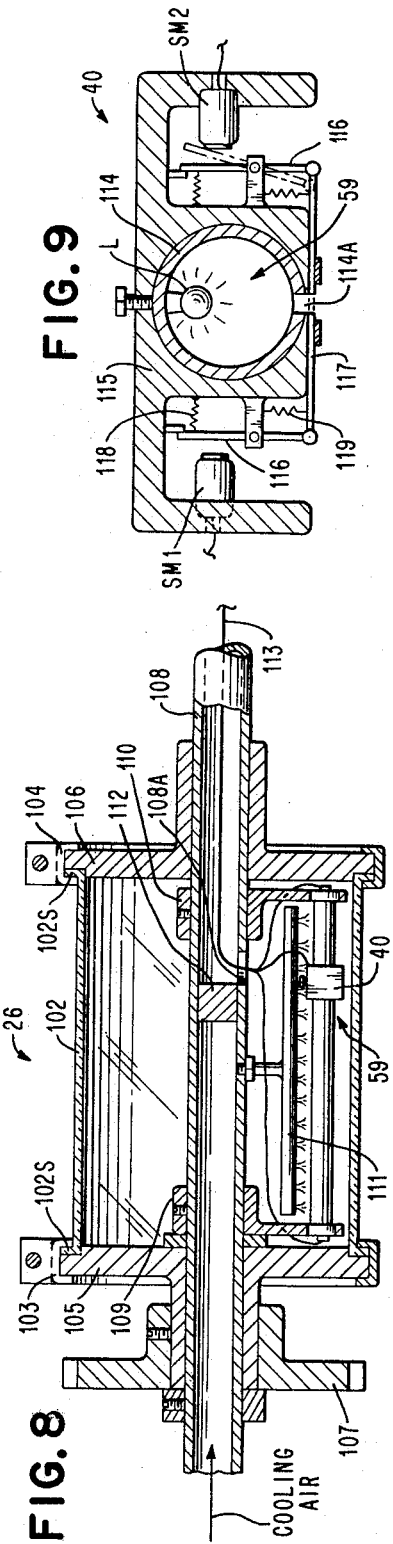

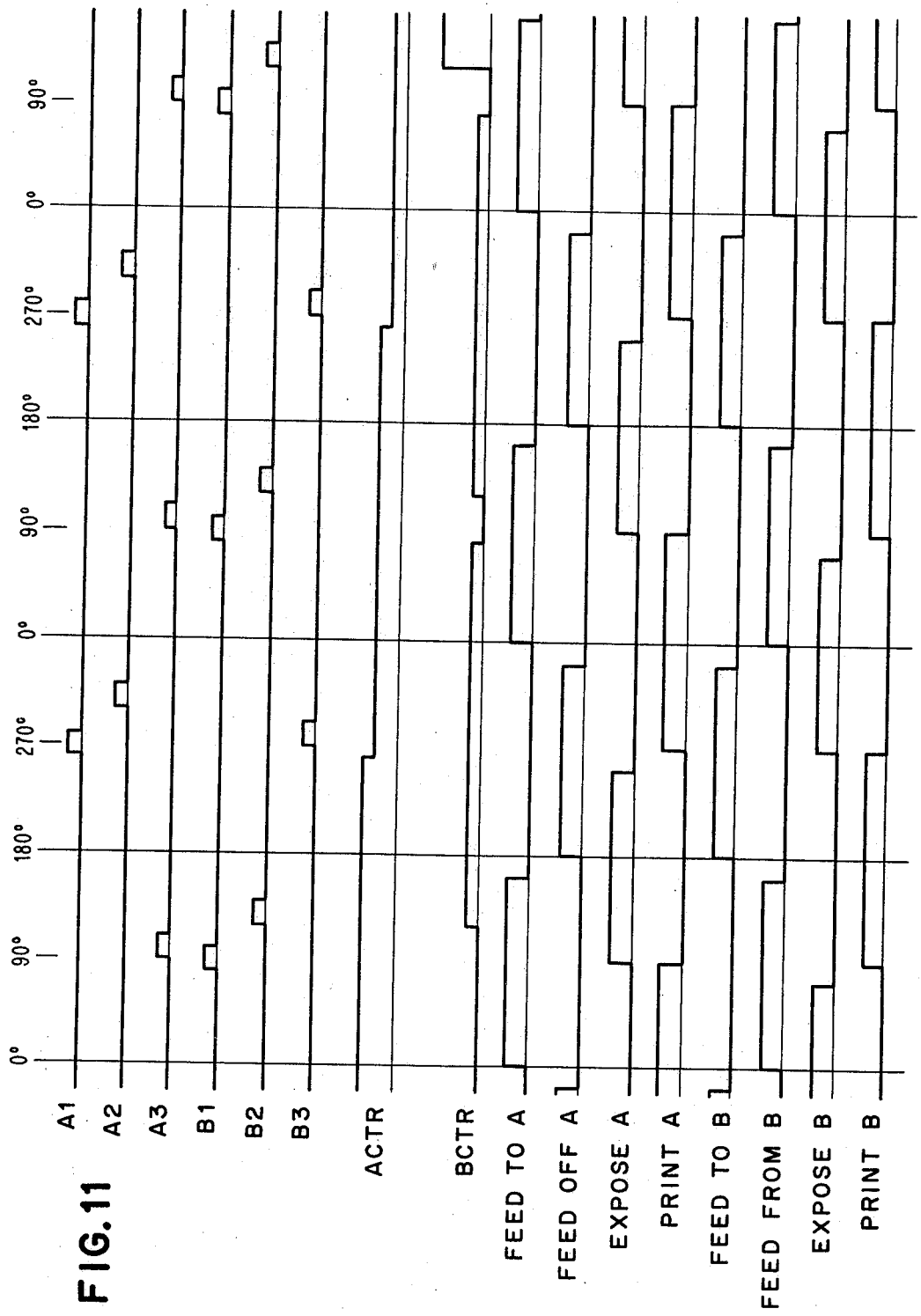

3,493,301
DOCUMENT PROCESSING METHOD
Arthur J. Sable, Riverside, Calif., and Charles J. Bashe, Armonk, and Robert E. Sandt, Chappaqua, N.Y., assignors to International Business Machines Corporation, Armonk, N.Y., a corporation of New York
Filed Jan. 26, 1966, Ser. No. 523,204
Int. Cl. G03b 27/32, 27/52, 27/12
U.S. Cl. 355—64                                                    1 Claim

ABSTRACT OF THE DISCLOSURE

A method of preparing a succession of documents and selected quantities of copies of each document, wherein each document has variable data content and may be copied with form background data is accomplished by printing the variable data in a required format together with control symbols identifying the required form background, and indicating the number of copies to be made and distribution thereof, reading the control symbols, selecting the background data thereby, and overprinting the selected background on each selected document, reading the control symbols indicating the number of copies to be made and printing the required number, of each document, adding to the copies the ordinal number thereof, and sorting the documents and copies into piles in accordance with indications of the control symbols and ordinal numbers.

---

Figure 1:
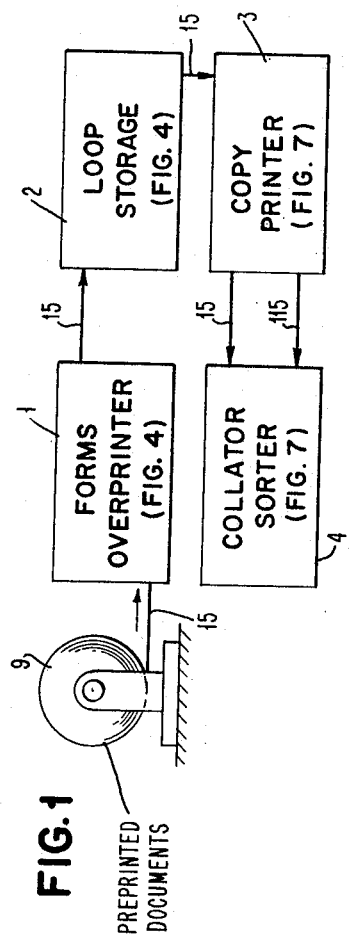

This invention relates to a method of preparing documents and copies thereof, and for assembling the original documents and the copies in prescribed arrangements, and more particularly to a method of selecting and overprinting form backgrounds upon documents preprinted in a record-controlled printer, for making selected copies thereof, and for assembling the original documents and the copies, all under control symbols preprinted by the record-controlled printer.

The conventional practice in preparing business instruments in a record or computer-controlled printer is to load the printer with multiple part preprinted stationery forms including interleaved carbon paper, and to print the variable data constituting the document in the assigned spaces on the form. Alternatively, general purpose preprinted forms may be used, and the printer programmed to print the additional form information (such as column headings) to adapt the general purpose form to the particular application. Following printing, the multiple part forms require bursting, separating, and assembling. Necessarily, such practice imposes restrictions upon the flexibility and speed of the printer. If fully preprinted stationery is used, the source records must be sorted so that all records relating to a given document format be processed at one time. This batch processing, while efficient in many applications, is not suitable for those applications requiring the preparation of only a few documents of each of a variety of document formats, where the time lost in loading the stationery forms into the printer is prohibitively great. Where general purpose forms are employed and the printer adds the requisite form headings to individualize the forms, the overall printer speed is prejudiced by the necessity of adding the repetitive information. A record-controlled printer, when it is printing a conventional business instrument, operates to skip rapidly over areas of the form wherein no data entries are required, thus effectively increasing its total document yield over the nominal document yield if printing were to be effected upon every line of the document. It is thus inefficient to use the record-controlled printer to print repetitive form headings and other so-called "boiler plate." A further limitation of a record-controlled printer is its inability to print other than prescribed alphanumeric and special symbols. Art work and special diagrams are, therefore, precluded from being printed by a conventional record-controlled printer.

In addition to the foregoing limitations upon the complete preparation of a variety of documents in a record-controlled printer, the making of copies and the assembling of the copies poses additional problems. When a general purpose document stationery form is used, as, for example, a two-part form with one carbon copy, it is frequently necessary to print the original twice in order to obtain an original and three copies. This expedient is frequently employed when only a few documents require more than one carbon copy, wherein it would be wasteful of stationery to load the printer with four-part forms just to accommodate the few documents requiring the excess copies. Even when a two-part form is employed, a requirement for an odd number of total sheets of any given document requires wasting one copy.

The instant invention is intended to obviate the foregoing limitations of the prior art method of document preparation by exploiting the speed and versatility of the record-controlled printer to print the variable data entries upon a document, and by further exploiting the capabilities of the electrophotographic printer to print form backgrounds upon the original documents and to make copies thereof in selected quantities. Not only does this combination produce an overall increase in the rate of document production, but also it permits the printing of form backgrounds limited only by the skill and ingenuity of the form designer. As an additional benefit, the invention includes automatic assembling and sorting of the original documents and the copies thereof under control of the computer program that controlled the initial preparation of the document.

Essentially, the instant invention operates "off-line" in that it operates upon a web of joined documents preprinted upon blank stationery by the printer, but independent of the printer. Thus, the printer output would be rolled as it issues from the printer, and then inserted into the forms printer, copier, and assembler. The speed of neither machine is, therefore, prejudiced by the operation of the other, while control over the subsequent operation still resides in the first printer. This control is achieved by programming the printer to print, in addition to the variable document data in the prescribed locations, control symbols individual to each document, which control symbols indicate the form background, the number of copies to be made, the document size, and special symbols to control the distribution of the original documents and the copies thereof.

In accordance with the foregoing summary of the invention, it is, therefore, an object to provide a method of printing a succession of documents and controllable quantities of copies of each of the documents and for providing for the selective distribution of the documents and the copies thereof by printing the documents and associated control symbols respectively manifestive of the form background, the number of copies to be printed, and the distribution to be made of the documents and copies upon blank stationery in a first printing operation, reading the control symbols manifestive of the forms background for each document and selecting and printing from a selected one of a plurality of form printing instrumentalities upon each document in a second printing operation; reading the control symbols manifestive of the number of copies to be made and printing the requisite number of copies of each original document in a third printing operation, adding to each of the copies thus made in said third printing operation marks manifestive of the ordinal number of the copy, and reading the control symbols on both the original documents and copies thereof and the ordinal marks on the copies and assembling the documents and copies in ordered stacks.

A further object of the invention is to provide a method of making a selected number of copies of an original document and for assembling the documents into ordered piles, wherein the original documents bear marks manifestive of the number of copies to be made, and of the desired distribution of the original documents by reading the marks on the original document manifestive of the number of copies to be made of each document and making the requisite number of copies of each document with its associated control marks adding to each copy marks manifestive of the ordinal number of the copy, reading the marks copied upon each copy and the marks added to each copy and assembling the copies in ordered stacks in accordance with these marks.

Another object of this invention is to provide an apparatus for making a controllable quantity of copies from each of a succession of documents having, in addition to the variable data constituting the respective documents, preprinted control marks associated with each document manifestive of the number of copies to be made thereof wherein the control marks on each document are sensed and the original document exposed to an electrographic printing element to produce repetitive images of the document under control of the marks to print the requisite number of copies.

A subsidiary object in accordance with the preceding object is to provide in the electrophotographic copying machine means under control of the number of copy marks on the original document for adding marks to each copy manifestive of the ordinal number of the copy.

An additional object of the invention is to provide in an electrophotographic printing machine means for varying the speed of the print receiving stationery therethrough and for controlling the exposure of the electrophotographic printing element as a function of the speed of the stationery feed.

Another object of the invention is to provide an electrographic copying machine for producing a variable number of copies of each of a succession of documents under control of marks preprinted upon each document manifestive of the number of copies to be made thereof.

The foregoing and other objects, features and advantages of the invention will be apparent from the following more particular description of a preferred embodiment of the invention, as illustrated in the accompanying drawings.

Figure 4:
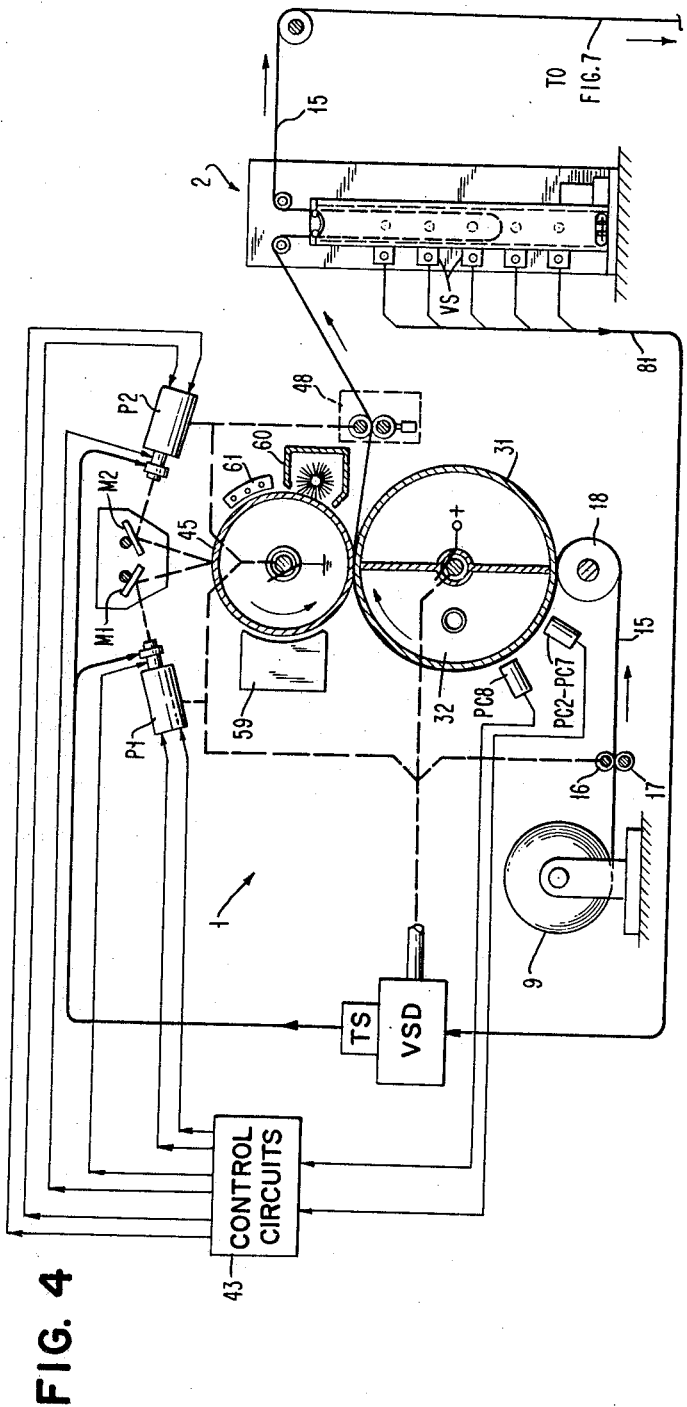
Figure 2:
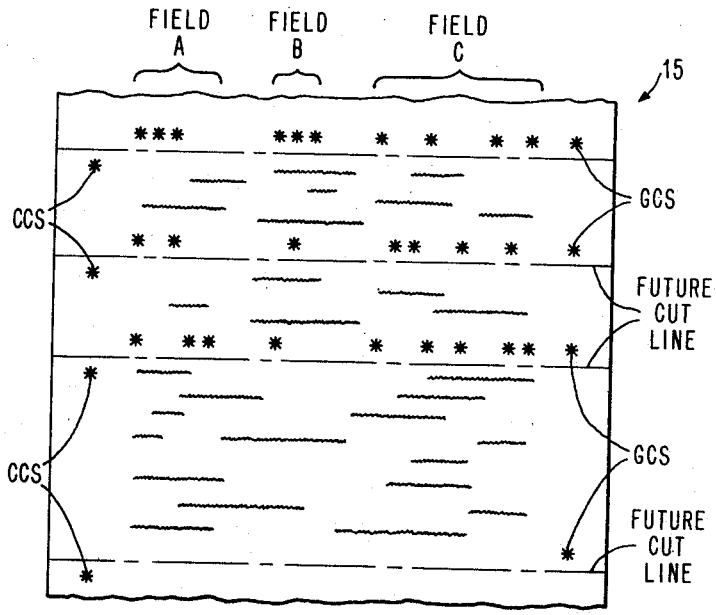
Figure 3:
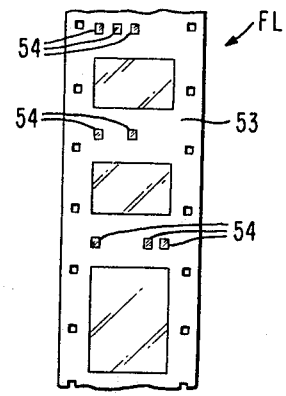
Figure 5:
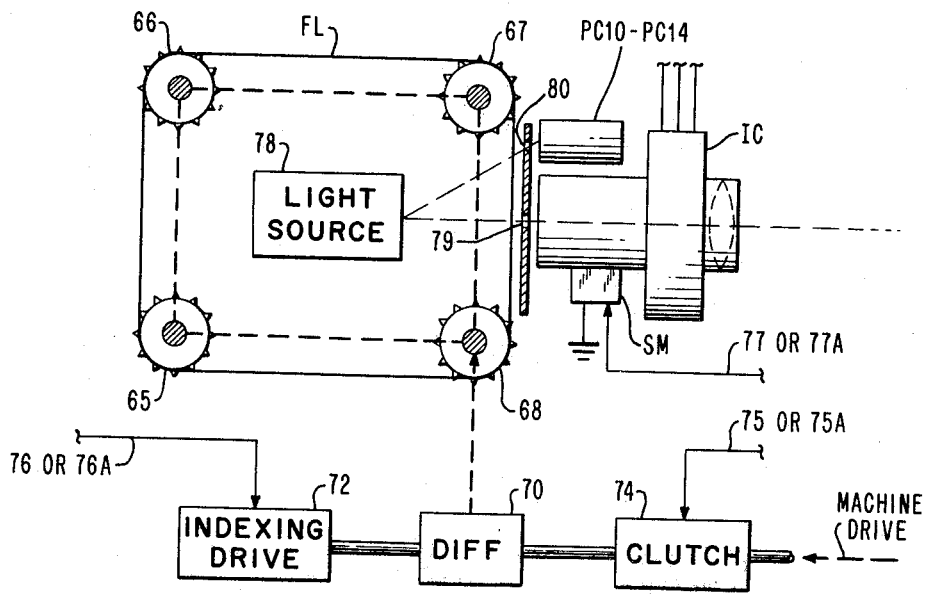
Figure 6:
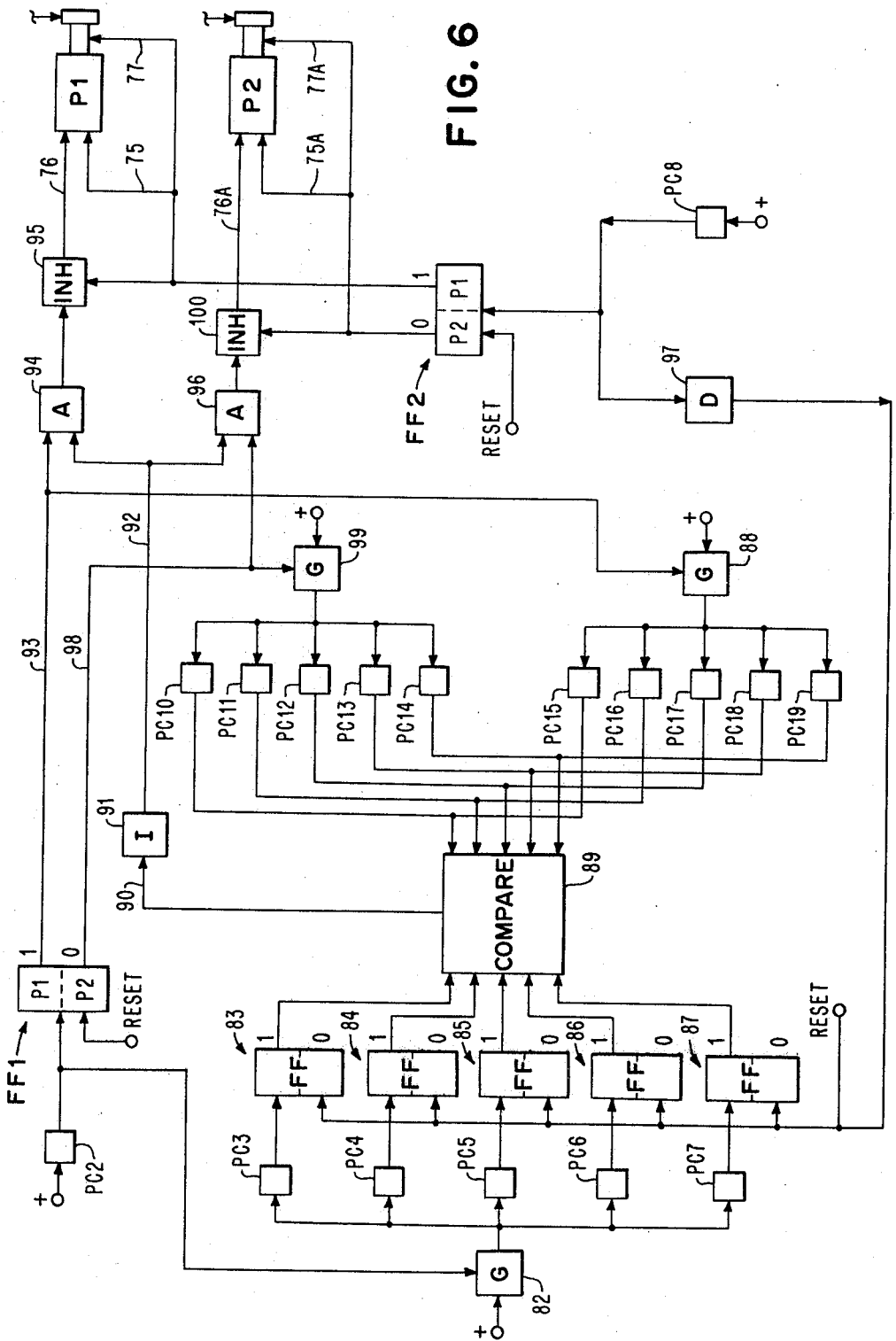
Figure 7:
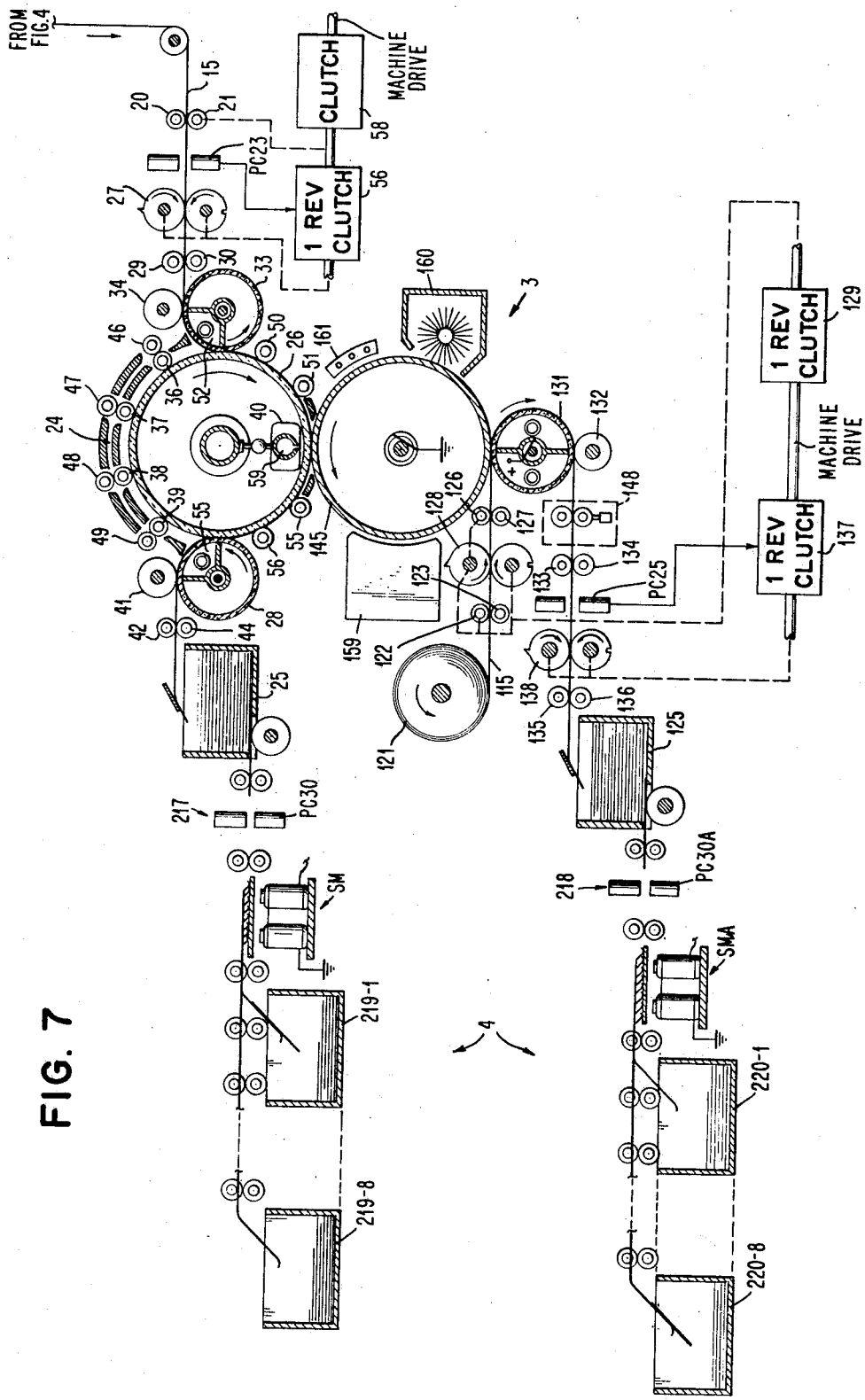
Figure 10:
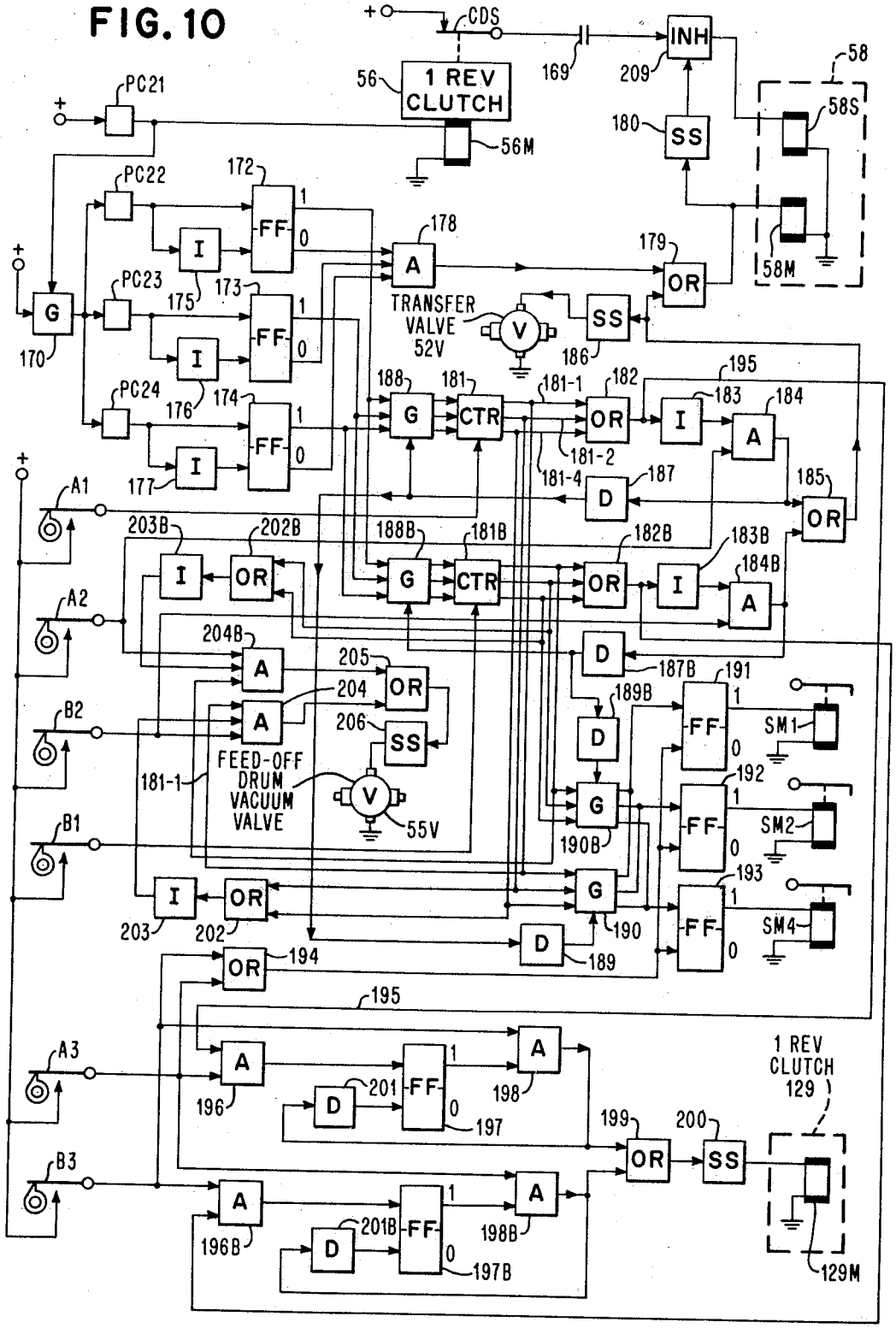
Figure 13:
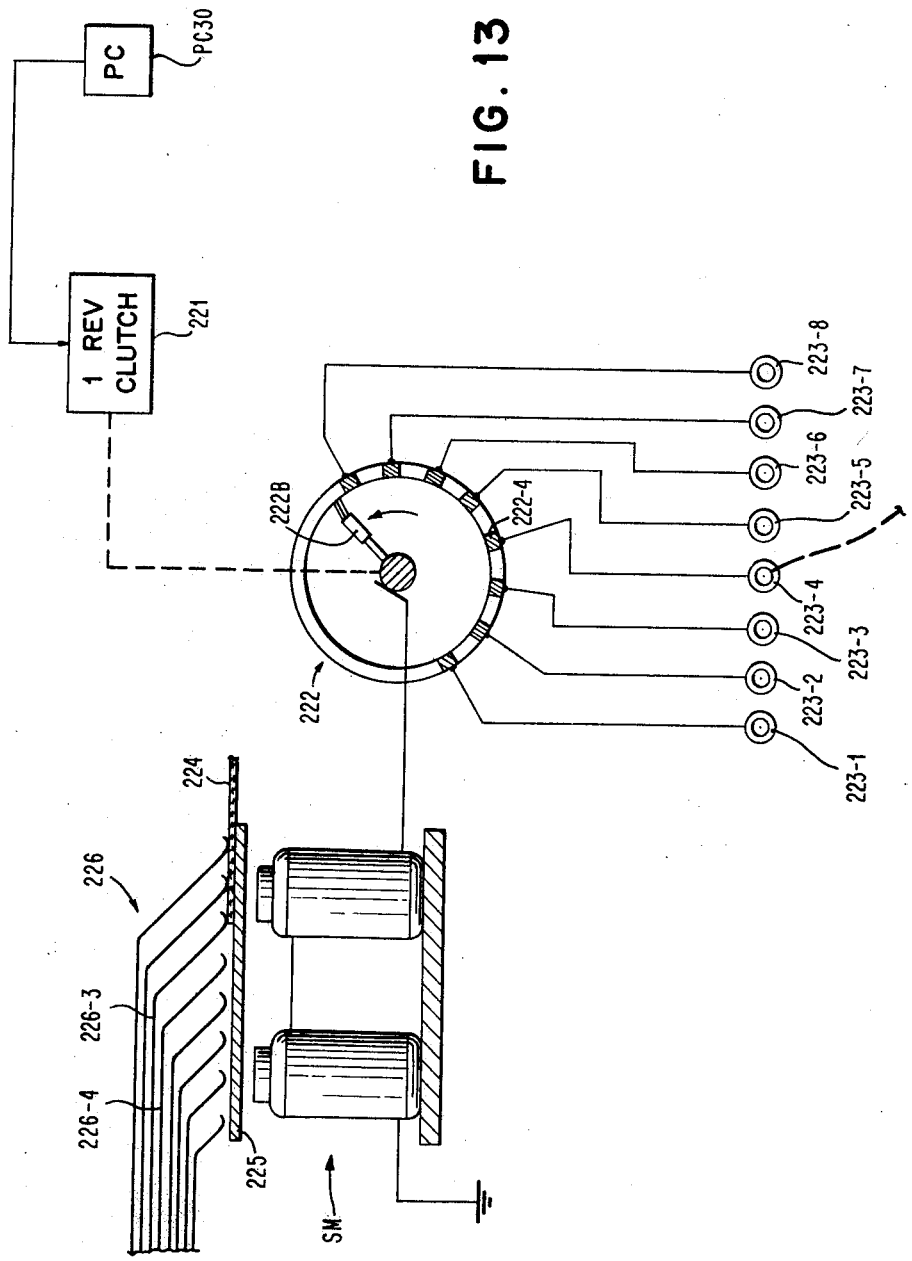
Figure 14:
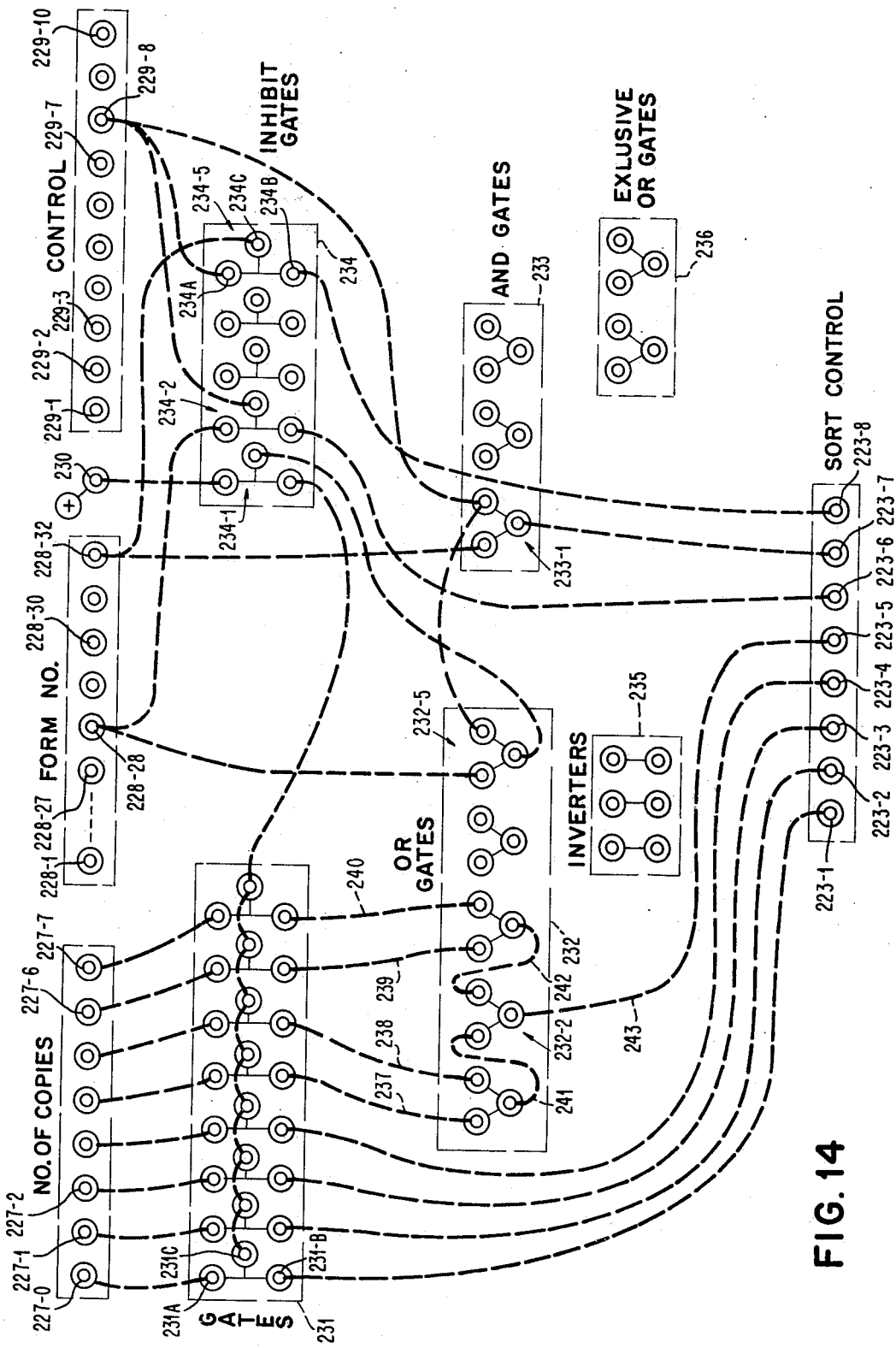

In the drawings:
FIG. 1 is a schematic block diagram of the invention.
FIG. 2 is a section of the web with the preprinted documents and control symbols.
FIG. 3 is a section of the film loop containing images of the form backgrounds.
FIG. 4 is a schematic structural drawing of the forms printer, and web loop storage device.
FIG. 5 shows details of the forms background projector.
FIG. 6 is a wiring diagram of the forms printer.
FIG. 7 is a schematic structural drawing of the copy printer and sorter.
FIG. 8 shows details of the original document feeding drum.
FIG. 9 shows details of the copy number printer.
FIG. 10 is a wiring diagram of the copy printer.
FIG. 11 is a timing chart of the copy printer.
FIG. 12 is a timing chart showing the timing of a typical succession of documents and copies through the copy printer.
FIG. 13 shows details of the sorter.
FIG. 14 shows a plugboard diagram for selectively altering the operation of the sorter.

The basic operation of the machine is shown in block diagram form in FIG. 1. The web 15, containing a succession of joined documents preprinted on blank stationery in a computer-controlled printer, together with sets of control symbols are fed from supply roll 9 to the selective forms printer 1. In the forms printer the control symbols for each document are sensed, and a form background compatible with each successive document is selected and overprinted upon each document, under control of the preprinted symbol. From the forms printer 1, the web 15 feeds to and through a loop storage device 2, which produces slack in the web 15 and varies the speed of operation of the forms printer 1, commensurate with the rate of acceptance of the succeeding copy printer 3. In the copy printer 3, preprinted control symbols denoting the number of copies to be made are sensed, and the requisite number of copies of each respective original document printed. The web 15 is cut into discrete documents in copy printer 3 and fed as such to the collator and sorter 4. The copies made from the original documents in the copy printer 3 are delivered as separate sheets, each having the original control symbols copied from the corresponding original document as well as additional control marks added to each copy by the copy printer 3, the added marks denoting the copy number (first, second, third, etc.). The copies feed to the sorter and collator 4. In the sorter and collator 4, the preprinted control symbols appearing on both the original documents and copies thereof, as well as the copy number (appearing only on the copies) are sensed, and distribution made of the originals and copies made in accordance with distribution orders established by control symbols preprinted upon the original documents.

Before proceeding with a detailed explanation of the various components whose function has been set forth, it is well to digress briefly and examine the nature of the preprinted document web 15 which controls the basic operation of the apparatus. This web is preprinted in a computer-controlled printer which has the capability of printing any character or symbol from the available printer font in any column of any line on blank or preprinted stationery to thus prepare a succession of documents having any prescribed format. In the instant application, the printer prints upon blank stationery which is then rolled on the roll 9, print side in, and the supply roll inserted for feeding in the reverse direction from its preparation into the forms printer 1.

Turning now to FIG. 2, which shows the web 15 as it might issue from the printer, the gating control symbol GCS (illustratively an asterisk, although any symbol may be used) is the only printing that is effected in the last column of the form. This gates the remaining control symbols appearing on the same line to be sensed, and ignores any other sumbols constituting the variable document data. The remaining control symbols appearing on the same line as the symbol GCS are conveniently divided into fields, much as one divides a punched card into fields, each with a different significance. Because of the tremendous bit capacity inherent in the 132 columns of printing typical of a conventional computer-controlled printer, the control fields, requiring only a small percentage of the potential capacity, may be widely separated to permit the use of segmented pinch rolls with the photosensing elements disposed in the space between the segmented rollers. Typically, Field A with five binary recording positions is allocated to forms selection, giving a capability of selecting from a library of thirty-two form backgrounds in the forms printer 1. Field B, containing three recording positions, controls the number of copies to be made from the original in copy printer 3. Field C (and any others deemed necessary) receive special computer-controlled combinations of asterisks to control the subsequent distribution of the originals and copies in the sorter and collator 4. For control of the forms printer 1, only the gating symbol GCS and Field A are necessary, and they are printed at the bottom of each new document, because the web 15 is rolled and fed backwards. Alternatively, the symbols may be printed serially in the last column. The computer which controls the printer is programmed to print the control symbols in positions compatible with the document format and with the subsequent column aligned sensing elements. The successive joined documents are of variable length, and each is terminated by a line of control symbols. A further cut control symbol CCS is printed in the first column just trailing the future cut line of the document above and is used in the copy printer 4 to control the trimming of the copies to the requisite length. Thus, each document is provided with a beginning and end of document mark. When rolled and unrolled backward, the GCS symbol leads the CCS symbol, the former being used to cut the original document web into discrete documents, and the later mark being used to trim the copies to the appropriate length.

Returning now to the forms printer 1 and a more detailed explanation of the operation, reference should be made to FIG. 4. All elements of the forms printer, except the projectors P1 and P2 are driven continuously, but at variable speed from the variable speed drive VSD. This variable speed is necessary since the copy printer 3 will operate at varying speeds as a function of the number of copies to be made. The variable speed drive is controlled by the loop storage device 2 and will operate in servo fashion to maintain a constant loop length in the loop storage device 2. The web 15, wound on supply roll 9 with the print side facing in, is fed therefrom by pinch rolls 16 and 17 (and others as necessary), over the reversing roll 18 and onto the evacuated feed drum 31. While on the drum 31, it feeds serially past two photocell sensing stations consisting respectively of photocells PC2 to PC7 and the photocell PC8. The drum 31 is perforated (or formed from a porous sintered metal) and is provided with an internal non-rotating baffled chamber 32 extending from 6 o'clock to 12 o'clock that adheres the web 15 lightly to the drum 31 during feeding. Photocells PC2 and PC8 sense the control symbol GCS (FIG. 2) while photocells PC3 through PC7 are aligned with and sense the control symbols in Field A (FIG. 2) of the document. The photocells PC2–PC7 read the form identification control symbols and, through control circuits 43, alternately index the projectors P1 and P2 to the appropriate frame on a film loop containing images of the form backgrounds to be overprinted on the documents. The projectors, when actuated by the photocell PC8, project their images upon the xerographic drums 45 through mirrors M1 or M2. While the projectors are exposing the projectors are exposing the drum 45, the film strip is moved past an exposure slit at scale speed (inversely proportional to the magnification of the projection lens) with respect to the linear speed of the drum 45. Since exposure of the drum is initiated by PC8, its arcuate distance from the printing station (at the bite of drums 45 and 31) is just equal to half the circumference of the printing drum 45. The arcuate distance between the two photocell sensing stations is less than the minimum document length, and the minimum traverse time of the web 15 past the two stations is greater than the maximum time required to index the film loop in the projectors P1 or P2 from one frame to the next needed frame. Thus, each projector will be completely indexed before exposure from that projector is required. As will be explained, when the projectors are described, the variable speed drive includes a transmitter TS (which may be a synchro or other motion transmitting device) which controls the iris diaphragms in the projectors as a function of the web feed speed, so as to effect a constant exposure of the xerographic drum. Qualitatively, the iris is stopped down as the web speed decreases, and vice versa.

The xerographic printer includes the conventional cleaning station 60, ion charging station 61, toner transfer station 59, and the toner fixing station 48 wherein heat and pressure fix the toner to the web 15. These elements are well known in the xerographic art and do not require elaboration.

Each of the projectors P1 and P2 (FIG. 4) contains a complete library of stored images for all 32 of the forms background, together with binary coded marks between film frames to identify the associated image. These are stored on continuous loops of FL of sprocketed film, a typical section of which appears as in FIG. 3. It is noted that a gating mark corresponding to the symbol GCS on web 15 is not needed, because the form background images will not produce a response in the sensing photocells compatible with that of the indexing marks. Specifically, the film space 53 between frames is opaque except for the transversely recorded codal marks 54. These marks are sensed by photocells in the projectors and control the high speed indexing thereof until the code marks match the control symbols printer in Field A of the document. The code marks 54 are placed a fixed distance from the leading edge of the corresponding frame containing the form background image. This distance equals the distance between the photocells and the frame exposure slit in the projectors P1 and P2. Since the film is projected onto an arcuate surface (drum 45, FIG. 1), it is moved past the exposure slit in timed synchronism with the drum movement during exposure of the drum. Thus, successive incremental line images are formed on the drum to produce the composite image thereon.

The projectors P1 and P2 are identical, and similar in nature to that described in U.S. Patent 2,783,454, issued Feb. 26, 1957, to D. O. North with some important exceptions. Referring to FIG. 5, which represents schematically the arrangement necessary to implement the requisite functions, the film loop FL is guided over sprockets 65, 66, 67 and 68, all of which are driven from differential 70 which receives drive inputs from either the film indexing drive 72 or the clutch 74, which clutch receives its drive from the basic machine drive, when energized by potentializing the line 75 (or 75A) from control circuit 43. A further line 77 (or 77A) operates the shutter magnet SM, to project the film image. When the film is indexing, clutch 74 is disengaged and its output shaft braked, and the indexing drive 72 (energized by a potential on line 76) drives the sprockets 65 to 68 and film loop FL at rapid speed through differential 70 until the photocells PC10 and PC14 sense a match between the film index marks and the document form control marks. The indexing drive 72 then stops and brakes its output shaft to lock the film loop in exposure start position. When the exposure start signal arrives on lines 75 and 77, shutter magnet SM operates to open the shutter to expose the drum, and clutch 74 engages to drive the film loop FL at scale speed. The light source 78 includes the conventional projection lamp and condenser lens standard in any film projector. It illuminates the film both at the projection slit 79 and the indexing slit 80, these slits being spaced apart a distance equal to the distance between the indexing marks 54 (FIG. 3) and the leading edge of the next following film frame. The iris control IC provides a variable stop opening for the projection lens controlled by a motion repeater such as a synchro, connected to a transmitter TS operated from the variable speed drive VSD. This variable control insures a constant exposure of the xerographic drum 45.

In FIG. 6 the circuits for controlling the alternate indexing and exposure of projectors P1 and P2 are shown. Proceeding in the sequence of events for a typical succession of documents, the first event occurs when the photocell PC2 senses the gating symbol GCS, while photocells PC3 through PC7 sense the control symbols in Field A of the document. Photocell PC2 opens gate 82 to apply potential from the plus voltage supply to photocells PC3 to PC7 so that they are active to sense only the control symbols. PC2 also complements the trigger FF1 (initially reset to status P2). The photocells PC3 to PC7 selectively store the codal marks in Field A in latches 83 to 87, these latches being initially reset upon start of operation of the machine. With FF1 in the P1 position (projector P1 active), gate 88 will be opened to apply potential to the projector indexing photocells PC15 through PC19 in projector P1. Since the film loop FL is now mis-indexed, comparator 89 yields no output signal on line 90, the absence of which signal is inverted in inverter 91 to energize line 92 and, together with the potential on line 93 energizes AND gate 94 to place a potential on line 76, since inhibit gate 95 is now inactive. Projector P1 indexes until the photocells PC15 to PC19 compare with the status of latches 83 to 87 when comparator 89 produces an output to depotentialize line 92 (and line 76) to stop the indexing. While indexing proceeds, the document proceeds to photocell PC8 which senses the control symbol GCS to reset latches 83 to 87 after a slight delay (through delay 97), and complements FF2 (reset to the P2 position) to occupy the P1 status. The setting of FF2 to the P1 status energizes the line 75 to engage the exposure clutch 74 (FIG. 4) and line 77 to energize the shutter solenoid SM (FIG. 5) to expose the drum. It also inhibits (through inhibit gate 95) any indexing signal from appearing on line 76, which would occur as soon as the film strip moves out of registration with its sensing photocells. The exposure from P1 continues until the photocell PC8 senses the next following document (the end of the preceding document) to switch FF2 to the P2 position to remove potential from the lines 75 and 77. The significance of this relationship will be appreciated if one remembers that the documents are preprinted on web 15 without intervening spaces.

When the second document reaches photocells PC2 through PC7 (while P1 is still exposing the drum 45), FF1 will switch to the P2 position to potentialize line 98 and open gate 99 to activate the photocells PC10 through PC14 in projector P2. Projector P2 now miscompares and lines 92 and 98 combine in AND gate 96 to produce an output passed by inhibit gate 100 to indexing line 76A of projector P2. When photocell PC8 senses the end of the second document, it switches FF2 to the P2 position to expose projector P2 by activating lines 75A and 77A. Switching of FF2 from P1 position to P2 position closes the shutter of projector P1, unclutches its exposure drive, and renders it operable to index when next PC2 senses a new GCS symbol.

In summary of the operation of the circuit diagram, PC2 gates the forms control code to latches 83–87 and initiates indexing of the appropriate projector through FF1. Indexing is complete before exposure starts. Photocell PC8 starts the exposure by switching FF2, which exposure terminates upon the next energization of PC8 by the next following GCS symbol. Since the documents are joined, exposure from one projector starts upon termination of the exposure from the preceding projector. The operation is continuous, but may vary in speed depending upon the control of the variable speed drive, with a consequent adjustment of the iris diaphragms in the projectors.

Following the overprinting of the form background in the forms printer 1, the web 15 feeds to the loop storage device 2, preferably incorporating the structure disclosed in U.S. Patent 3,057,568, issued Oct. 9, 1962, to J. A. Weidenhammer et al. This device employs an evacuated web loop chamber into which the loop is tensioned by atmospheric pressure. A succession of spaced ports and vacuum switches VS are exposed to atmospheric or subatmospheric pressure depending on the web loop length to sense the loop length. These switches, when connected to the variable speed drive VSD, by cable 81 cause it to speed up or slow down to maintain a constant loop length.

From the loop storage device 2, the web 15 is fed by clutched pinch rolls 20 and 21 past a sensing station 23 when the number of copies to be made (Field B) is sensed. If no copy is to be made, the leading edge of the web 15 is diverted into the upper bypass feed path 24 and thence to stacker 25. If a copy is to be made, the leading edge of the web 15 is diverted and fed on drum 26. In both instances, the next following gating control symbol GCS, sensed at station 23, operates a rotary shear 27, to separate the preceding document from web 15 to allow it to proceed in either the bypass feed path 24 or on drum 26. A document fed on drum 26 will, if only one copy is required, by fed off the drum by diverter roll 28 to stacker 25. If multiple copies are required of a given document, it will remain on the drum 26 and will be recirculated the requisite number of times.

An original document, when it is fed on drum 26 rolls in contact with the xerographic printing drum 145 to expose it. To this end the drum 26 is transparent and contains a light source 59 which illuminates the document as it rolls in contact with the drum 145. A copy number printer 40 attached to the light source applies copy number marks to drum 145, in a manner to be described.

The xerographic drum rotating clockwise serially traverses the cleaning station 160, charging station 161, the exposure station (tangent with drum 26), toner transfer station 159, and the printing station (tangent to print transfer roller 131). The copy paper 115 feeds over print transfer roller 131 to the fixing station 148, and is stacked as separate documents in stacker 125.

Returning in more detail to the feeding, sensing and cutting of the original document web, feed rolls 20 and 21 and the rotary shear 27 are driven through a clutched drive, the shear 27 being additionally clutched. When these elements are clutched, they operate synchronously with the basic machine drive. All other feeding elements in the original document feed operate continuously, although they may or may not have a document therein.

A document feeding into and through the bypass path is engaged by feed roll 29 and 30, 33 and 34, 36 and 46, 37 and 47, 38 and 48, 39 and 49, 28 and 41, and 42 and 44. These rolls are driven from the basic machine drive at a constant speed, wherein the lineal document speed is constant throughout the machine. A document feeding in the copy feed feeds through rolls 29 and 30, 33 and 34, to drum 26 where it rolls beneath rolls 50 and 51 to printing drum 145, and then beneath rolls 55 and 56 to diverter roll 28 and roll 41 to rolls 42 and 44 to stacker 25. If a second copy is required, the document continues on drum 26 beneath rolls 39, 38, 37, 36 and 33 to repeat the cycle. It is noted that certain of the feed rolls are common to both the copy feed and the bypass feed. The feed-in roll 33 and the diverter roll 28 are similar in construction, both being fabricated of a porous material and having non-rotating internal chambers which are normally pressurized, but which may be evacuated by operation of a control valve. In the feed-in roll 33, the internal chamber 52 extends from 12 o'clock to 3 o'clock and is evacuated by operation of a transfer valve 52V to transfer the chamber from the normally pressurized state to the evacuated state. The remaining internal chamber in roll 33 is continuously pressurized to effect document separation. The corresponding chamber 55 in diverter roll 28 extends from 9 o'clock to 12 o'clock and is selectively evacuated by operation of transfer valve 55V. The remaining 270° of roll 28 is continuously pressurized to effect document separation. Thus, a document fed to the feed-in roll 33 will be normally deflected by the air flow therethrough into the bypass feed 24. When copying is required, the valve 52V is operated to evacuate the chamber to divert the feed to the drum 26. A document feeding on drum 26 will be maintained on the drum by the air leakage out of diverter roll 28, which air flow also assists the feeding of a document in the bypass feed 24 into the bite of feed roll 41 and diverter roll 28. When a document is to be removed from the drum 26, the chamber 55 is evacuated by operation of transfer valve 55V so that the document adheres to roll 28 for one-quarter revolution thereof.

Although the drum 26 is completely symmetrical, it is divided by the machine timing into two halves, which for ease of reference and correlation with other machine elements are labelled the A drum and B drum. Documents fed to the drum will occupy either the A drum or B drum with their leading edge always aligned with one of two diametrically disposed positions on the drum. The circumference of the drum 26 is slightly greater than twice the maximum document length so that two documents may occupy the drum at the same time.

Assuming that the web 15 is stationary in the bite of the feed rolls 20 and 21 with its leading edge stopped just short of the constantly running feed rolls 29 and 30, and that the control symbols in Field B, having been sensed at sensing station 23 and stored, signal that two copies are to be made, a feed signal synchronized with the rotation of drum 26 engages the clutch 58 to drive rolls 20 and 21 to feed the web 15 forward. The same feed signal evacuates chamber 52 of the feed-in roll 33 to feed the document to drum 26 so that it aligns with the prescribed position on the A drum. The clutch 58 remains engaged until the next following control symbols are sensed at station 23, which sensing engages the one revolution clutch 56 (driven from clutch 58) to engage the rotary shear 27 to cut the web 15 just ahead of the line of control symbols just sensed. This allows the document cut from the web to proceed in the copy feed on the A drum. As soon as the shear 27 operates and the one-revolution clutch 56 latches up, the clutch 58 is disengaged to stop the web feed with its leading edge just short of the bite of feed rolls 29 and 30. For the attainment of this end, the one-revolution clutch 56, which conventionally has a detent pawl that drops into a notch on the driven shaft to latch the driven shaft after one revolution, is additionally provided with contacts CDS which are closed when the detent pawl falls into the notch. The closure of these contacts CDS disengage clutch 58.

The document feeding on the A drum passes the exposure station where the copy printer 40 is operated to produce coded marks indicative of the number two on the xerographic drum 145, along with the image of the original document. The document then feeds past the diverter roll 28 (continuously pressurized) which maintains the document on the A drum for a second revolution and exposure. Meanwhile, the next following document with the control symbols sensed and stored is motionless in the feed. When a feed signal synchronized with the movement of the B drum arrives, clutch 58 is engaged to feed the next following document to the B drum for copying. If this requires but one copy, the copy printer will print a one code mark on drum 145 and the document will feed off drum 26 by evacuation of the diverter roll 28 chamber 55 as the leading edge approaches its bite. The document remaining on the A drum will pass feed-in roll 33 (now restored to its normal pressure state) for a second exposure, wherein the copy printer will mark the drum 145 with a one code mark. The document will then feed off drum 26 by evacuation of diverter roll 28.

If the second document had required no copying, then the clutch 58 would not have been disengaged, the feed-in roll 33 would remain pressurized, and the document would have been fed to the bypass feed without interruption. The sensing of the next following control symbols would cut the web to permit the document to proceed in the bypass feed. The web 15 is always cut following sensing of the control symbols, so that the preceding document may continue in its selected feed direction even if the web feed is stopped.

The sensing of the control symbols, in addition to operating the rotary shear 27 to cut the web, also stores the number of copies to be made. If the count is zero (no copies), clutch 58 is engaged to feed to the bypass feed. If the count is other than zero, this copy count is entered into either the A counter or B counter, depending to which drum the document feeds. The thus entered number in the A or B counter controls the copy number printer 40 to print the requisite copy number. If the counter registers a count of one, it controls the evacuation of diverter roll 28 to feed the document off the drum 26. If the count is two or more, the document remains on the drum. After the document passes 3 o'clock (rotating counterclockwise), the counter is decremented by one count. The count in the counter now standing at more than zero signals that the corresponding drum section is occupied and, when tested, prevents feeding of a document to that section of the drum. If, on the other hand, only one copy were required, the counter would receive an initial count of one, which, when decremented by one, would yield a zero count, which, when tested, would signal an empty drum and permit entry of a new document. Thus the A and B counters receive a copy count upon each entry of a new document and are decremented by one count as the drum section traverses the upper half of its revolution. Each of the counters controls the feeding in and feeding off of documents to the copy drum 26. A count of zero feeds in a new document, while a count of one feeds a document off the drum.

The bypass feed 24 is a longer feed path than the copy feed on drum 26. Thus, a copy fed from the drum will lead one feeding in the bypass feed. Not only does this keep the documents in order, but also it facilitates merging of the document feeds at feed roll 41.

The drum 26 has been stated to be transparent and contains the light source 59 for exposing the xerographic drum through the original document to be copied. It has also been stated, without further elaboration, that the copies are marked with a coding manifestive of the copy number. These details require further explanation. Reference to FIG. 8 will reveal a construction which permits glass or other transparent substance to be employed in fabricating the drum while still permitting access to the internal light source 59 and copy number printer 40. The glass cylinder 102 is formed with shoulders 102S which are clamped by split circumferential clamps 103 and 104 to the shouldered drum heads 105 and 106 to form a drum, the end members having attached hollow shaft portions which permit journalling and driving the drum (as by means of gear 107), while at the same time permitting access to the drum interior for cooling air and wires to the lamp and copy printer 40. To this end a tubular support 108 mounts lamp brackets 109 and 110 and an elongated perforated blast tube 111 for lamp cooling. Plug 112 and exhaust port 108A provide access for the wiring 113 to the lamp and the copy printer 40, as well as permitting the cooling air to escape. Removal of clamp 104 gives access to the drum interior.

The copy printer 40 and its coaction with the light source 59 is shown in greater detail in FIG. 9. The light housing 114 containing tubular light source L has an internal configuration which concentrates the light on the exit slit 114A and thus on the printing station. It is surrounded by a saddle 115 to which the copy number print shutters are mounted. This saddle is slideably mounted on the lamp housing to permit its axial alignment with an assigned blank field on the document form. The saddle 115 mounts three shutter magnets SM1, SM2, and SM4 (two of which are shown) in staggered relationship. Each of these magnets operates upon a different armature 116 to attract it and slide the shutter 117 over the light exit slit. Springs 118 and 119 restore the armature and restrain the shutter against the lower surface of saddle 115. The shutters 117 lie adjacent to one another with a spacing compatible with the printer column spacing, and are operated combinatorially to represent the number of copies in the binary notation. The magnets SM1, SM2, and SM4 are set by the copy counter as each document feeds, either de novo or repetitively, past the receiving station on drum 26 to manifest the copy number. As the leading edge of the document feeds to the exposure station, the shutters simulate black marks on the document by obscuring the passage of light. As soon as the control symbols on the original document pass the exposure slit, the magnets SM1, etc., are deenergized to open the slit for exposure of any document information that might be aligned with the copy number field. The copy produced by this apparatus will contain none, one, two, or three strips extending from the end of the document copy (web 15 is fed backwards) to the line of control symbols. The magnets SM1, SM2, and SM4 are set for each document by the A and B copy counters and will actually count backward, the first copy to be produced will be marked with the highest copy number, the second with the next highest number, etc.

All of the preceding explanation has been confined to the feeding, cutting, and exposure of the original document web and documents cut therefrom. No attention has been directed to the xeropgraphic copy printing or to the feeding, cutting, and stacking of the copies. The blank copy paper is stored on supply roll 121 from which it is fed by pinch rolls 122 and 123 and pinch rolls 126 and 127 past the rotary shear 128 when copying is to be effected. A one-revolution clutch 129 is energized to drive the pinch rolls for as many revolutions as are required to feed a length of web 15 equal to the maximum document length. The shear 128 operates at the end of this feed to cut a copy sheet from the web 15, the leading edge of the copy sheet being arrested just short of the bite of drum 145 and roll 131. The thus fed and cut copy sheet is immediately available for receiving the ink transfer from drum 145 upon the next copy signal. It feeds between drum 145 and reversing roll 131 (evacuated counterclockwise from 12 o'clock to 6 o'clock), around roll 131 to roll 132, heater and fixing rolls 148, feed rolls 133 and 134 past PC25 to feed rolls 135 and 136, to stacker 125. The photocell PC25 senses the cut control symbol CCS (FIG. 2) and trips a one-revolution clutch 137 to cut the copy sheet to size. The shear 138, when clutched by clutch 137, operates synchronously with the copy feed to cut the sheet on a line just following the cut control symbol CCS. The shear 138 when clutched, operates synchronously with the copy feed to cut the sheet on a line just following the cut control symbol CCS. The feed rolls 122, 123, 126, 127 and shear 128 are all driven through the one-revolution clutch 129 which in turn is driven from the basic machine drive. Drum 145, rolls 131, 132, 133, 134, 135, and 136 are all rotated continuously in synchronism with the basic machine drive so as to preserve the constant lineal document speed throughout the machine; all documents, when they are fed by a clutched feed, thus feed smoothly into the constantly-running feed.

The xerographic printer includes the conventional photoconductive drum 145, cleaner 160, ion charging station 161, toner applicator 159, and the tone fixing station 148. These are known elements in this printing process and do not require further elaboration. Since exposure to light erases the electrostatic charge on the drum, the covering of the light source slit by the copy number printer 40 at the leading edge of each new document will prevent destruction of the charge for the duration of closure of the slit. The drum when toned will adhere ink to these bands of charges to print short coded stripes at the top of each copy document. These stripes begin at the top edge of the document and terminate at the bottom of the printing line containing the preprinted control symbols. The marks are made in a field of the document unused for recording other control symbols. These stripes will align with photocell sensors in the sorter and collator 4 to control the distribution of the copies.

The controls for effecting the coordinated operation of the copy printer 3, whose mechanical construction has been explained, are shown in the wiring diagram of FIG. 10. The coordination with the mechanical operation is effected by the circuit breaker contacts A1, A2, A3, B1, B2 and B3 all of which are closed by cams mounted on the basic machine drive and are referenced to the feed of the copy drum 26. The A contacts relate to the A drum, and the B contacts relate to the B drum. The detailed timing of these contacts will be treated when the machine timing is examined in detail. For the understanding of the wiring diagram, it is sufficient to state that the contacts A1 close briefly when the A drum is in the upper half of its revolution, and that the A2 contacts close shortly thereafter at a time such that the leading edge of the web 15, waiting just short of feed rolls 29 and 30 (FIG. 7), will start its forward feed and arrive on the A drum in the requisite orientation. The B1 and B2 contacts are similarly timed with respect to the B drum, and are thus 180° out of phase with respect to the corresponding A contacts. Contacts A3 close as the leading edge of a document fed on the A drum enters the bite of drum 26 and drum 145 for exposure. Contacts B3 close 180° later, when a document on the B drum enters the exposure position. With these basic timing relationships in mind, one is now prepared to examine the wiring diagram in greater detail.

As the web 15 feeds to the sensing station 23, photocell PC21 thereat senses the gating control symbol GCS (FIG. 2) to energize the clutch magnet 56M to engage the one-revolution clutch to synchronize the rotation of the rotary shear 27 with the web feed to cut the web at the required shear line. When the one-revolution clutch 56 completes its one-revolution of movement, and the clutch detent pawl drops into the notch in the driven disc to close contacts CDS, their closure sends a pulse through capacitor 169 to pulse the stop magnet 58S of clutch 58, to declutch the drive to feed rolls 20 and 21 and thus arrest the web feed. The energization of PC21 by the sensing of GCS also opens gate 170 to activate the photocells PC22 through PC24 to sense Field B (with which they are aligned) to detect the number of copies to be made. These photocells will be combinatorially energized (or not energized) in binary fashion to set the latches 172, 173 and 174 directly to the binary one state, or indirectly to the zero state through inverters 175, 176, and 177, thus storing the number of copies to be made. If the latches 172, 173 and 174 are all in the binary zero state (no copies), their outputs ANDed in AND gate 178 will activate OR gate 179 to energize the run magnet 58M of clutch 58 to continue the web feed, and also fire the single-shot 180 to operate the inhibit gate 209 for the time equal to the revolution of the one revolution clutch 56 to prevent it from operating the stop magnet 58S to interrupt the web feed. The web feed thus continues into the bypass feed 24, the photocell PC21 sensing the next following GCS symbol to cut the web to allow the document now in the bypass feed to continue. The normally pressurized feed-in roll 33 remains pressurized to effect the feed into the bypass feed.

If the latches 172, 173, and 174 have any count other than zero, the one-revolution clutch 56 operates to cut the web 15 and disengage clutch 58, in the manner already explained, to stop the web feed. If the A counter 181 contains a count of zero, the OR gate 182 will yield no output which when inverted in inverter 183 indicates that the approaching A drum is empty. When the A2 contacts close, AND gate 184 will be energized to cause the web to feed to the copy drum. Energization of AND 184 operates OR gate 185 and OR gate 179 to actuate clutch magnet 58M and engage clutch 58 to feed the web 15 forward. The clutch energization pulse, originating with the closure of A2, also fires single-shot 186 to transfer the solenoid valve 52V to transfer the chamber 52 in the feed-in roll 33 from pressure to vacuum for the duration of the firing of single-shot 186, sufficiently long to permit the web edge to feed to the feed-in roll 33, around the roll to drum 26 to the copy feed. AND gate 184 (when timed by closure of A2) operates through delay 187 to open the three-way gate 188 to gate the number of copies stored in latches 172–174 into the A counter 181. This delay is necessary because the A counter must first be tested for a zero count to initiate the feed before it receives a new copy count. A second delay 189 (following delay 187) opens gate 190 to gate the A counter to latches 191, 192 and 193, which latches operate selective ones of the shutter magnets SM1, SM2 and SM4 of the copy number printer 40 (FIGS. 7 and 9). The document continues its feed on the copy drum 26, and is severed from the web by the next following gating symbol GCS. When the leading edge passes the printing station, contacts A3 close. This closure opens the copy printer shutters and alerts the copy paper feed. The first of these events occurs when OR gate 194 is energized by A3 to reset the latches 191, 192 and 193 to deenergize the shutter magnets SM1, SM2 and SM4 to open the light slit to expose the areas of the document to follow. Since the A counter 181 must have at least a count of one therein, OR gate 182 will be energized to produce an output on line 195 to activate AND gate 196 when A3 closes. AND gate 196 switches trigger 197 to the one state to store the need for a copy feed 180° later. When B3 closes, 180° later, its closure coupled with the one state of trigger 197 activates AND gate 198 to energize OR gate 199 and single-shot 200 to trip the one-revolution clutch 129 (copy paper feed clutch) through magnet 129M. AND gate 198 operates through delay 201 to reset trigger 197 to the zero state in preparation for the next document feed on the A drum.

The document feeding on the A drum may continue for a second copying thereof or may be diverted by diverter roll 28 to stacker 25. The decision as to its destination is determined by the count in counter A. If this count is one, the line 181–1 (the one line of counter 181) will be energized and lines 181–2 and 181–4 deenergized, thus OR gate 202 will yield no output which through inverter 203 will combine with the potential on line 181–1 and the pulse from B2 to activate AND gate 204, OR gate 204, OR gate 205 and single-shot 206 to operate the solenoid transfer valve 55V to evacuate the chamber 55 in diverter roll 28 to feed the document off the drum and to stacker 25. The B2 impulse occur at a time when the leading edge of the document on the A drum approaches the diverter roll, and the single-shot 206 has a timing duration sufficient for the document to feed off the drum and into the feed out feed path.

If, when B2 closes the count in counter A is other than one, then AND gate 204 will yield no output to cause evacuation of the diverter roll 28. The document, therefore, remains on the copy drum 26 for a second copying. When A1 closes after the leading edge of the document on the A drum passes diverter roll 28, it decrements the A counter 181 by one count. The count standing in A counter 181 must now be at least one. Therefore, when A2 closes to test the A counter content, OR gate 182 will be energized, inverter 183 deenergized, to prevent operation of AND gate 184 and OR gate 185. Thus, valve 52V will not be operated nor will clutch 58 be energized. The web 15, therefore, cannot be fed to enter a new document on the now occupied A drum. On the second revolution of the document on the A drum, the now decremented count in the A counter will activate the copy printer magnets to print code numbers equal to one less than the previously printed number.

While the document was feeding on the A drum, the next following document was free to feed in the bypass feed 24 as soon as it was sensed. If the document required copying, the operation just traced for the feeding of a document to the A drum would be repeated for the next document feeding to the B drum, with operations lagging the corresponding A operations by 180°. Circuit elements for the B operation are duplicates of those controlling the A operation and bear similar reference numbers with a "B" added thereto.

Summarizing the operation of the control circuits, duplicate circuits are provided for the A and B drum halves, and these circuits are alternately called into action by the contacts A1, B1, A2, B2, A3, and B3 which are closed by rotation of the basic machine drive. As each successive document is sensed, it feeds either to the bypass feed or copy feed. Feeding to the copy feed is initiated only when the copy counter registers a zero count, indicating an empty drum section. The new count is entered and the web fed to the empty drum section. If multiple copies are to be made, this counter is decremented by one count to control the feeding of the document off the copy drum when the count reaches one. Each of the copy counters controls the copy number printer to mark the copy with symbols manifestive of the copy number.

The overlapping of functions and their relative times of activity are shown in the timing diagram of FIG. 11. The timing is all oriented with respect to rotation of the copy drum 26, with 0° occurring when a given drum line passes the point of tangency with feed-in roll 33 to mark the beginning of the A drum. The B drum starts 180° later. Thus, the line on the timing chart labelled "Feed to A" measures the time that the document feeds from roller 33 to drum 26 in the A half thereof. Since the drum is larger than two document lengths, the feeding to drum 26 always takes less than 180°, and for short documents very much less. The feed from the A drum starts at 180° concurrently with the start of the feed to the B drum. The leading edge of the document enters the exposure station 90° after it starts its feed to drum 26. Thus, a document on the A drum starts exposure at 90° and one on the B drum starts exposure at 270°. Once exposure starts from a given document edge, the image of that document on the xerographic drum 145 arrives at the printing station 180° later. Thus, a document exposed 90° to 160° (the latter will vary) will print on the copy paper from 270° to 90° of the next cycle. Exposure from the B drum starts at 270° and printing from that image starts 180° later at 90° in the next cycle.

Turning now to the shaft-controlled contacts A1, A2, A3 and B1, B2 and B3, their timing is shown in the top six lines of FIG. 11. Contacts A1 may close at any time after the leading edge of the document feeding on the A drum passes diverter roll 28 (at 180°). The only other requirement is that they must close before A2. Closure of A1 is arbitrarily chosen to occur at 260° and remains closed for 20°, again arbitrary. When A2 closes at 260° the A counter (ACTR) is decremented by one count, shown as steps in ACTR line at 260° in the first and second cycles indicating an initial count of three decremented successively to two and one counts. The A2 closure occurs after closure of A1, its time being a function of the geometry of the feed. Closure of A2 precedes 0° by the time necessary for the leading edge of 15 sitting just short of feed rolls 29 and 30 to be moved (as clutch 58 is engaged by A2) to the bite of feed roll 33 and drum 26. This closure has been shown at 300°. In addition to initiating feeding to the A drum (precluded in the timing illustrated because the A counter registers a count other than zero), contacts A2 enter the copy count into the A counter, also precluded in this example, because the A counter (ACTR) has counts of three, two, and one at A2 time.

The B1 contacts closing at 80° initially seek to decrement the B counter (BCTR) which already registers a zero count. The B counter, therefore, remains at zero. When B2 closes at approximately 120°, the B counter is empty to permit feeding to the B drum and entry of a one count therein as shown by the one step rise in the BCTR line. When B1 next closes, the B counter is decremented to zero for entry of a second one count when B2 closes next (shown by the short zero count in the BCTR line). The final setting of the B counter at the end of the timing chart shows an entry of a four count.

As was shown in the wiring diagram (FIG. 10), B2 initiated the diversion of a document from the A drum and A2 initiated the diversion from the B drum, through a single-shot. Since a document feeds to the B drum as one feeds off the A drum this 180° phase reversal is understandable. In lieu of the single-shot, additional contacts can be added with a longer duration and timing to evacuate the drum 28 for the requisite time.

The A3 and B3 contacts control the copy printer 40 and the initiation of the feed of the copy stationery. Contacts A3 operating at 90° restore the shutters in the copy printer to open the light slit, thus adding marks to the leading edge only of the document copy. The B3 contacts perform the same function for documents fed on the B drum. Since a document on the A drum begins exposure of the xerographic drum 145 at 90° machine time, and that first exposure image arrives at the print station 180° later, the B3 impulse (at 270°) actuates the copy paper feed for a document copied from the A drum. Conversely, the A3 contacts actuates copy paper feed for a document copied from the B drum. All of the foregoing timing is approximate and indicates the relative sequence of events. In practice, the timing is adjusted approximately and then refined as the machine is cranked slowly through its sequence of operations. A final refinement in the adjustment is made by operating the machine at speed and viewing the operation thereof with a stroboscopic light or by high-speed motion pictures. This permits compensation for time lags in the operation of the various mechanical elements. Once the machine is thus timed, the adjustments are locked.

A further timing chart (FIG. 12) shows a typical procession of documents requiring varying number of copies from zero to five, through the machine. If it is arbitrarily assumed that the documents numbered from 1 to 14 require the number of copies as follows:

| Document: | No. of copies |
|---|---|
| 1 | 5 |
| 2 | 2 |
| 3 | 0 |
| 4 | 0 |
| 5 | 0 |
| 6 | 4 |
| 7 | 1 |
| 8 | 2 |
| 9 | 0 |
| 10 | 3 |
| 11 | 2 |
| 12 | 2 |
| 13 | 1 |
| 14 | 1 | then the timing diagram of FIG. 12 will be readily understood. The first line of boxes with numbers therein show the documents feeding into and out of the A drum. The second line of boxes shows the feeding of documents into and out of the B drum. The final line with encircled document numbers shows the documents fed in the bypass feed. Starting from left to right, document 1 feeds to the A drum and remains there for five revolutions to produce the requisite five copies. Document 2 follows immediately to the B drum and remains there for two revolutions. Document 3 feeds immediately following document 2 and through the bypass feed. If document 3 required copying, it would have been withheld until the B drum was empty in the third cycle. Meanwhile, however, the fourth and fifth documents follow immediately behind the third document to the bypass feed and stacker. When the trailing edge of the fifth document feeds into the bypass feed, the sixth document finds the B drum empty and feeds thereon for four revolutions, during which time the first document feeds off the A drum at 180° of the fifth cycle, and the seventh document takes its place at 0° of the sixth cycle and feeds off at 180° of that cycle. At 0° of the seventh cycle, the sixth document feeds off the B drum and the eighth document feeds on the A drum for two revolutions thereon. The ninth document, fed at 180° of the seventh cycle following feeding of document 8 could have fit on the B drum if a copy of it were required. However, since no copy is required, it feeds to the bypass feed and out. The B drum, therefore, remains empty, until 180° of the eighth cycle, when it receives the eighth document for two revolutions. Document 11 feeds on the A drum at 0° of the ninth cycle and off at 180° of the tenth cycle followed by document 10 from the B drum at 0° of the eleventh cycle. Document 12 feeds on the A drum at 0° of the eleventh cycle and off at 180° of the twelfth cycle for the requisite two copies. Documents 13 and 14 feed on and off the B drum during the eleventh and twelfth cycles to complete the illustrated succession of documents.

Remembering that the bypass feed is longer than the copying feed, and assuming for ease of understanding that all documents are of comparable length, then the order of delivery of the original documents to stacker 25 is as follows:

3; 2; 4; 5; 1; 7; 6; 9; 8; 11; 10; 13; 12; 14

The order of deliveries of the copies to stacker 125 will be as follows:

1; 2; 1; 2; 1; 6; 1; 6; 1; 6; 7; 6; 8; 8; 10; 11; 10; 11; 10; 12; 13; 12; 14

Thus, during twelve cycles of drum 26, fourteen original documents have been fed through the machine and a total of twenty-three copies produced. For other combinations of copies, and no copies, the output will vary. Obviously, no more than two copies per revolution of drum 26 can be produced. So, also, will the document "throughput" be slowed if a larger number of copies is required. To offset this, the bypass feed for no copies, proceeding as it does immediately upon the sensing of no copies, permits a rapid feeding of documents, particularly if these happen to be short documents, as they can feed immediately without reference to drum 26. Thus, if the ratio of maximum to minimum document length were 4:1, then four minimum length documents could be passed by the bypass feed while one preceding maximum length document was being copied in the copy field.

A further refinement of the present apparatus wherein the document length is sensed at station 23 would permit loading the appropriate drum section with a multiplicity of documents whose aggregate length does not exceed the half drum circumference. An even further refinement, including the provision of an erasable magnetic drum rotating with drum 26 and upon which index marks measuring the respective limits of the documents loaded thereon, together with the number of copies of each to be made, would permit a self-synchronizing drum loading and unloading, and provided in effect, timing controls such as those provided by the contacts A1 to A3 and B1 to B3 with a timing readjusted for every combination of document lengths. This asynchronous type of operation would effect an improvement in the overall speed of operation at the expense of additional complication. It would not provide any additional functions, however.

If the ultimate in copying speed were required, it can be attained by providing a series of xerographic drums over which the original document web is rolled in succession. The first of these drums would be actuated for the first copy, the second drum for the second copy, etc. Each drum and its associated paper feed would be selectively called into action by the coded marks on each document. Thus, though a given document might pass seriately over eight copying drums, only the first two thereof would be operative to produce copies, if only two copies were required. If no copies of a given document were to be made, it would pass over all of the copying drums without activating them. This machine configuration would require a multiplicity of xerographic drums and attendant cleaning, charging, and inking stations, as well as multiple paper feeds. The speed increase would, therefore, be attained at a consequent multiplication of cost. One advantage of such a configuration would, however, be the possibility of using different colored stationery for the different copies. The same effect is achieved in the instant preferred embodiment by applying a distinct copy marking to each different copy, which copy marks have the additional advantage of being machine sensible to control their sorting destination.

The original documents piled in stacker 25 and the copies piled in stacker 125 contain all of the original preprinted control symbols including the document format (Field A), the number of copies (Field B), and the special control symbols (Field C). In addition, each copy contains marks which signify whether it is the first, second, third, or subsequent copy. This permits sorting in a great variety of manners. Since the original documents are all stacked in stacker 25, and the copies in stacker 125, there is no need to sense whether a given sheet of paper is an original or a copy, although the copy number print which appears only on the copies can provide such a control.

The documents in the stackers 25 and 125 are fed one at a time by conventional sheet feeding and separating means to the respective sensing stations 217 and 218. Here, all of the control symbols are sensed by photocells under control of the gating control symbol GCS (FIG. 2). These control symbols are stored in latches, as are the copy number code stripes printed upon each of the copies by the copy number printer 40. These latches, operating through pluggable logic, control the distribution of the original documents and the copies to any one of the pockets 219–1 to 219–8 and 220–1 to 220–8. Because the sheets are fed seriately through their respective feeds at a constant speed, the time delay from sensing to sorting is constant. Therefore, while the distance from the sensing station to the sort diverting entrance may vary, it should not exceed the length of the shortest document, because the storage latches must have exercised their control before the next following document is sensed. This obviates the need for employing duplicate storage latches, alternating between documents. Although documents of different lengths will feed past the sensing station 217 and energize the photocells at various times, depending on document length, the leading edge of any given document will always arrive at the sorting entrance a fixed time following sensing of the control symbols. This relationship is exploited by using the gating symbol GCS (FIG. 2) to time the operation of the mechanical sorting destination controls to the movement of the document. Since each of the sorters employs a construction similar to that shown in the U.S. Patent No. 1,741,985 issued to E. A. Ford, Dec. 31, 1929 wherein chute blades are selectively parted in synchronism with the passage of the leading edge of the document to open a feed path to the selected pocket, the sort magnet SM (FIG. 13) must be operated at the requisite time. Therefore, when PC30 senses the gating control symbol GCS, it not only gates the control symbols to storage latches (as in FIG. 6), but also engages the one-revolution clutch 221 which drives the sort commutator 222 (FIG. 13) in timed synchromism with the feeding of the leading edge of the document. If the plughub 223–4 is energized to sort to the fourth pocket, the moving brush brush 222B of commutator 222 will arrive at the commutator segment 222–4 as the document 224 occupies the position shown in FIG. 13. Current flow through hub 223–4, brush 222B, commutator segment 222–4 and sort magnet SM energizes it to attract armature 225 to produce an opening between the chute blades 226–3 and 226–4, and the document will be fed between to chute blades to the appropriate pocket 219–4. The plughubs 223–1 to 223–8 are energized by pluggable logic shown in FIG. 14.

Turning now to FIG. 14 wherein the pluggable logic is illustrated as a plugboard diagram with appropriate legends, the plughubs 223–1 to 223–8 are the same plughubs shown internally wired to the sort commutator 222 in FIG. 13. By plugging through the logic one of these plughubs is selectively energized for each document feeding from the sensing photocells to the chute blades. The plughubs 227–0 through 227–7 represent the number of copies recorded in Field A, decoded by internal circuitry to a decimal representation by means of a diode matrix or other decoder activated from the storage latches, which latches are set by the photocells which sense Field A. The plughubs 228–1 through 228–32 are similarly energized from a decoding matrix activated by the latches storing the reading of Field B. There are thirty-two plughubs 228–1 through 228–32, representing the library of form backgrounds. The plughubs 229–1 to 229–10 are the sort control symbols of Field C (FIG. 2) and are directly energized without decoding by the latches which store the photocell response to these control symbols. The plughub 230 is connected to a constant voltage supply. Thus, all of the plughubs at the top of FIG. 14 are current producing hubs, while those at the bottom (sort control) are current utilizing hubs. When a current producing hub is connected, either directly, or through intervening logic, to a sort control hub a document is sorted to the corresponding pocket.

Between the current producing plughubs and the sort control plughubs are pluggable logic elements, including gates 231, OR gates 232, AND gates 233, inhibit gates 234, inverters 235, and EXCLUSIVE OR gates 236. Gates 231 have an input hub 231A, and output hub 231B and a control hub 231C, which when energized connects hubs 231A and 231B in conductive relationship. Similarly, but conversely, the inhibit gates 234 disconnect hubs 234A and 234B when control hub 234C is energized. OR gates 232, AND gates 233, and EXCLUSIVE OR gates 236, each have two input plughubs and a single output plughub to provide the connections to the requisite logic functions. Inverters 235 have only two plughubs and operate as a logical NOT. The various logic elements are selectively plugged to control sorting in the desired manner, a typical example of which will now be traced.

Assume that it is desired to effect the following sort distribution:

(1) Sort all priority documents, except the president's report to the eighth pocket.

(2) If the president's report is also a priority document, sort it to the seventh pocket.

(3) Sort all non-priority checks to the sixth pocket; if it is a priority check, sort to the eighth pocket.

(4) Sort all other original documents (including a non-priority president's report) as follows:

(a) Documents requiring none, one, two, or three copies respectively to the first, second third or fourth pockets.

(b) Documents requiring four or more copies to the fifth pocket.

The foregoing sort rules are implemented by the plugging shown by the heavy dotted lines of FIG. 14. Starting first with a priority document not a president's report, signalled by a control impulse on hub 229–8 (priority) and the absence of a pulse on hub 228–32 (president's report form). The impulse on hub 229–8 feeds through inhibit gate 234–5 to hub 223–8 to effect sorting to the eighth pocket. Had the document been a president's report also, inhibit gate 234–5 would have been inhibited to prevent the sort to the eighth pocket. In this latter instance, the presence of an impulse on hub 228–32 and 229–8 is combined in AND gate 223–1 to pulse hub 223–7 to sort a priority president's report to the seventh pocket.

If the original document is a non-priority check, hub 229–8 will be unpotentialized and hub 228–28 (check form) will be potentialized. This will allow the impulse from hub 228–28 to pass inhibit gate 234–2 to plughub 223–6 to sort a non-priority check to pocket six. A priority check sorts to pocket eight.

If a document is non-priority, and not a check (it may be a non-priority president's report), it will sort by the number of copies required. This is achieved by pugging hub 229–8 (priority document) and 228–28 (check)

to OR gate 232-5 and the output therefrom to the control hub of inhibit gate 234-1. The presence of either a check or a priority document will inhibit this gate. Otherwise, a plus potential from hub 230 will pass the gate 234-1 to open all of the gates 231 to pass the impulse which will appear on one of the hubs 227-0 (no copy) to 227-7 (seven copies) through the gates 231. The first four connections from 227-0 to 227-3 pass directly through the corresponding gates in the group 231 to the respective plughubs 223-1, 223-2, 223-3, and 223-4 to effect the requisite sort. Copies in excess of three are combined in OR gates 232-1, 232-2, and 232-3 by plugging connections 237 through 242. The plugwire 243 connects the final OR gate 232-2 to the plughub 223-5 to sort all documents not checks, not priority documents, and requiring a number of copies in excess of three to pocket five.

It will readily be appreciated that sorts other than the one illustrated can be performed under the combined controls of the number of copies, the form identification, and the special computer-controlled control symbols appearing in Field C. The logic elements can be combined by plugging in any combination to effect a variety of functions, there being shown but a few of these elements to obviate overcrowding of the drawings.

A second plugboard is provided for the copy sorter. This plugboard will have the same features as that shown in FIG. 14 with the important addition of plughubs indicating the copy number, this being read from the copy number stripes printed by the copy number printer 40. These sensed copy number marks, when decoded will appear as plughub impulses on a second plugboard (not illustrated) from plughubs similar to the hubs 227 on FIG. 14. These, when plugged with other combinations of impulses derived from sensing Fields A, B, and C (copied from the original to all copies) through the appropriate logic will control the distribution of the copies to their respective pockets in the same manner as sorting of the original documents is effected. Only one typical sorting operation is necessary to understand the principle of the pluggable logic and control thereover by the preprinted marks.

It will readily be appreciated that more or less sort pockets may be provided following either the stackers 25 or 125, eight being an arbitrarily chosen number. It will also be apparent that the arrangement of the machine has been laid out to facilitate schematic presentation of the requisite functions, and that many details necessary to a complete operating machine, which details are well-known to one skilled in the art, have been intentionally left out so as not to obscure the lucidity of the exposition. Sufficient explanation of the overall function and collaboration of the machine elements has been advanced to enable one to understand the basic concept of the invention wherein preprinted control marks on a succession of preprinted documents control the selection and overprinting of a form background compatible with each document, and wherein the control marks control the printing of the requisite number of copies of the original documents and distribution of the documents and copies thereof into ordered stacks.

While the invention has been particularly shown and described with reference to a preferred embodiment thereof, it will be understood by those skilled in the art tha various changes in form and details may be made therein without departing from the spirit and scope of the invention.

What is claimed is:

1. The method of preparing a succession of documents and selected quantities of copies of each separate document, and for assembling the original documents and the copies thereof in ordered stacks, wherein each successive document has a variable data content, adapted for a corresponding document format and its form background data comprising the steps of:
    (a) printing the variable data constituting each of the successive documents upon blank stationery in the required format in a first printing operation together with control symbols individual to each document for identifying the required form background, and indicating the number of copies to be made thereof, and the distribution thereof;
    (b) reading the control symbols for identifying the form background for each successive document, selecting a background data bearing instrumentality bearing said background, and overprinting the corresponding form background upon each successive document in a second printing operation;
    (c) reading the control symbols printed upon the original documents in said first printing operation from each of said original documents indicating the number of copies to be made and printing the requisite number of copies of each original document in a third printing operation, adding to each of the copies thus made in said third printing operation marks indicating the ordinal number of the copy, and reading the control symbols copied into said copies and the ordinal marks printed upon each copy in said third printing operation and sorting the original documents and copies into piles in accordance with predetermined combinations of the control symbols and marks.

References Cited

UNITED STATES PATENTS

| 2,026,500 | 12/1935 | Hutchings. | |
| 3,090,287 | 5/1963 | Ritzerfeld | 95—1.7 |
| 2,355,268 | 8/1944 | Bryce | 88—24 |
| 3,199,404 | 8/1965 | Bragg | 88—24 |
| 3,354,774 | 11/1967 | Smitzer | 88—24 |

OTHER REFERENCES

IBM Technical Disclosure Bulletin, vol. 3, No. 2, July 1960.

JOHN M. HORAN, Primary Examiner

U.S. Cl. X.R.

355—109